United States Patent [19]
Menzies et al.

[11] Patent Number: 6,012,331
[45] Date of Patent: Jan. 11, 2000

[54] MULTIFUNCTION AIRCRAFT PROBES

[75] Inventors: Margaret A. Menzies, Ruckersville; Guntis U. Baltins, Charlottesville; David N. Martin, Free Union, all of Va.

[73] Assignee: Avionics Specialties, Inc., Earlysville, Va.

[21] Appl. No.: 09/109,072

[22] Filed: Jul. 2, 1998

[51] Int. Cl.[7] .................................................. G01C 21/00
[52] U.S. Cl. .............................................................. 73/180
[58] Field of Search .................................. 73/861.65, 180, 73/182, 861.67, 170.14, 170.02; 92/5 R

[56] References Cited

U.S. PATENT DOCUMENTS

| | | | |
|---|---|---|---|
| 4,833,917 | 5/1989 | Wilson | 73/170.14 |
| 4,841,844 | 6/1989 | Tootle | 92/5 R |
| 5,544,526 | 8/1996 | Baltins et al. | 73/180 |
| 5,811,691 | 9/1998 | Jackson | 73/861.65 |

*Primary Examiner*—William Oen
*Attorney, Agent, or Firm*—Nixon & Vanderhye P.C.

[57] ABSTRACT

Improved multifunction probe designs include circumferentially separated pairs of sensing ports which may respectively be dedicated to angle of attack functionality and air data pressure sensing functionality. In one preferred embodiment, a multifunction aircraft probe is provided with a rotatable probe element which is adapted to project outwardly from an aircraft with which it is operatively mated. The probe element is provided with a centrally located (i.e., in substantial alignment with the probe's stagnation line) dynamic pressure sensing port, and outer and inner pairs of pneumatic sensing ports which are symmetrically circumferentially separated from one another and from the dynamic pressure sensing port. Most preferably, each of the outer pneumatic sensing ports is circumferentially spaced from the central dynamic pressure sensing port by a first angle (e.g., substantially 90°) while each of the inner pneumatic sensing ports is circumferentially spaced from the central dynamic pressure sensing port by a second angle (e.g., substantially 45°). In such a manner, the angle of attack functionality may be maintained completely independent of the air data pressure sensing functionality of the probe assembly.

19 Claims, 7 Drawing Sheets

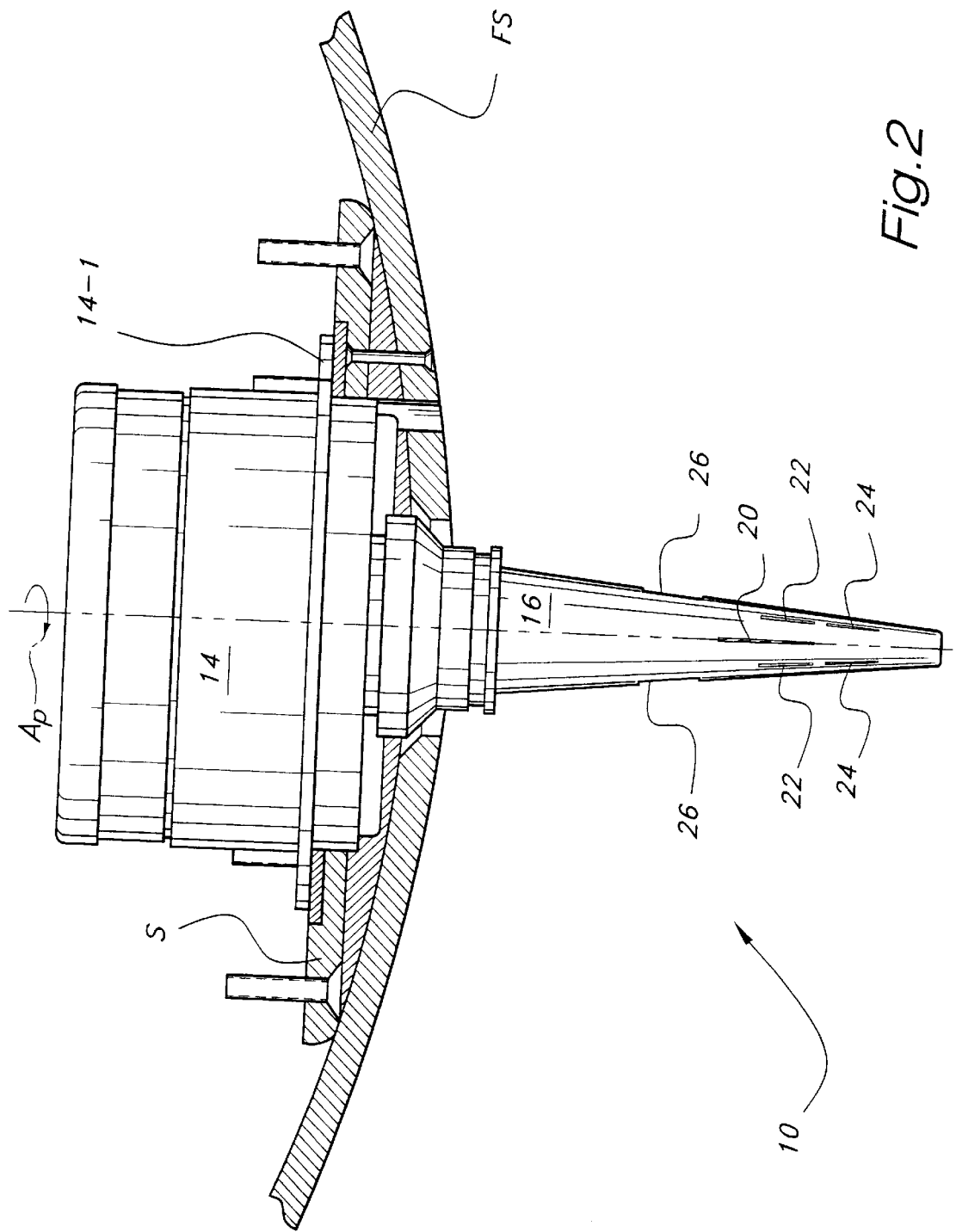

MULTIFUNCTION AIRCRAFT PROBES

CROSS-REFERENCE TO RELATED PATENT

This application is related to commonly owned U.S. Pat. No. 5,544,526 issued on Aug. 13, 1996 to Guntis U. Baltins et al (hereinafter referenced as "Baltins et al '526"). The entire content of this Baltins et al '526 patent is expressly incorporated hereinto by reference.

FIELD OF THE INVENTION

The present invention relates generally to multifunctional aircraft sensor probes which derive flight data and/or information (e.g., angle of attack, side slip, airspeed, altitude and/or vertical speed).from airstream pressure conditions of the aircraft's flight profile.

BACKGROUND AND SUMMARY OF THE INVENTION

Multifunction aircraft sensor probes are known, such as the multifunction aircraft probe assemblies disclosed in the above-cited Baltins et al '526 patent. In this regard, the probe assemblies of the Baltins et al '526 patent are generally embodied in a rotatable airstream direction probe which is additionally provided with a dynamic pressure sensing port positioned substantially midway between a pair of pneumatic sensing ports which are symmetrically positioned with respect to the probe's stagnation line. A set of pneumatic output ports may thus be provided, each of which communicates with a respective one of the pneumatic sensing ports in the probe.

Thus, when the pneumatic pressures within the paired sensing ports are balanced, the pneumatic pressure at the output port(s) in communication with the sensing ports will be essentially at a pressure $P_1$ which is a monotonic function of static (atmospheric) pressure over a wide range of airspeeds (e.g., from 0.1 Mach to supersonic speeds). The dynamic pressure sensing port, on the other hand, will be presented directly to the airstream when the pressures within the pneumatic sensing ports are balanced. As a result, a dynamic pressure output port which communicates with the dynamic pressure sensing port will exhibit a maximum airstream pressure $P_0$ which is a monotonic function of pitot (ram) pressure over a wide range of airspeeds. These pressures $P_1$ and $P_0$ can thus be converted mathematically into actual pitot (ram) and static (atmospheric) pressures undiluted by any error dependent upon the aircraft's angle of attack and/or side slip. The probe can thus be employed to derive angle of attack and/or side slip flight data information, in addition to primary flight data, such as airspeed, altitude and/or vertical speed.

It has now been discovered that the multifunction probe design embodied in the Baltins et al '526 patent may be improved by providing circumferentially separated pairs of sensing ports which are respectively dedicated to angle of attack functionality and air data pressure sensing functionality. The probe design in accordance with the present invention is especially well suited to reduce the impact of the complex shock system that develops about the probe during supersonic flight. Thus, improved airstream pressure sensing capabilities ensue.

In one aspect of the present invention, therefore, a multifunction aircraft probe is provided with a distal probe element which is adapted to project outwardly from an aircraft with which it is operatively mated and being mounted for rotational movement about its projection axis. The probe element is provided with a centrally located (i.e., in substantial alignment with the probe's stagnation line) dynamic pressure sensing port, and outer and inner pairs of pneumatic sensing ports which are symmetrically circumferentially separated from one another and from the dynamic pressure sensing port. Most preferably, each of the outer pneumatic sensing ports is circumferentially spaced from the central dynamic pressure sensing port by substantially 90° (i.e., circumferentially separated from one another by about 180° so as to be substantially latitudinally opposed to one another) while each of the inner pneumatic sensing ports is circumferentially spaced from the central dynamic pressure sensing port by substantially 45° (i.e., circumferentially separated from one another by about 90°. In such a manner, the angle of attack functionality may be maintained completely independent of the air data pressure sensing functionality of the probe assembly.

These and other aspects and advantages of the present invention will become more clear after careful consideration is given to the detailed description of the presently preferred exemplary embodiment thereof which follows.

BRIEF DESCRIPTION OF THE ACCOMPANYING DRAWINGS

Reference will hereinafter be made to the accompanying drawings, wherein like reference numerals throughout the various FIGURES denote like structural elements, and wherein, FIG. 1 is a partial perspective view of a forward section of an aircraft showing a preferred sensor assembly in accordance with the present invention;

FIG. 2 is a partial cross-sectional view taken through the aircraft fuselage along lines 2—2 in FIG. 1 as viewed from the oncoming airstream flow showing in an enlarged manner a preferred sensor assembly of the present invention;

DETAILED DESCRIPTION OF THE PREFERRED EXEMPLARY EMBODIMENTS

Figure 1:
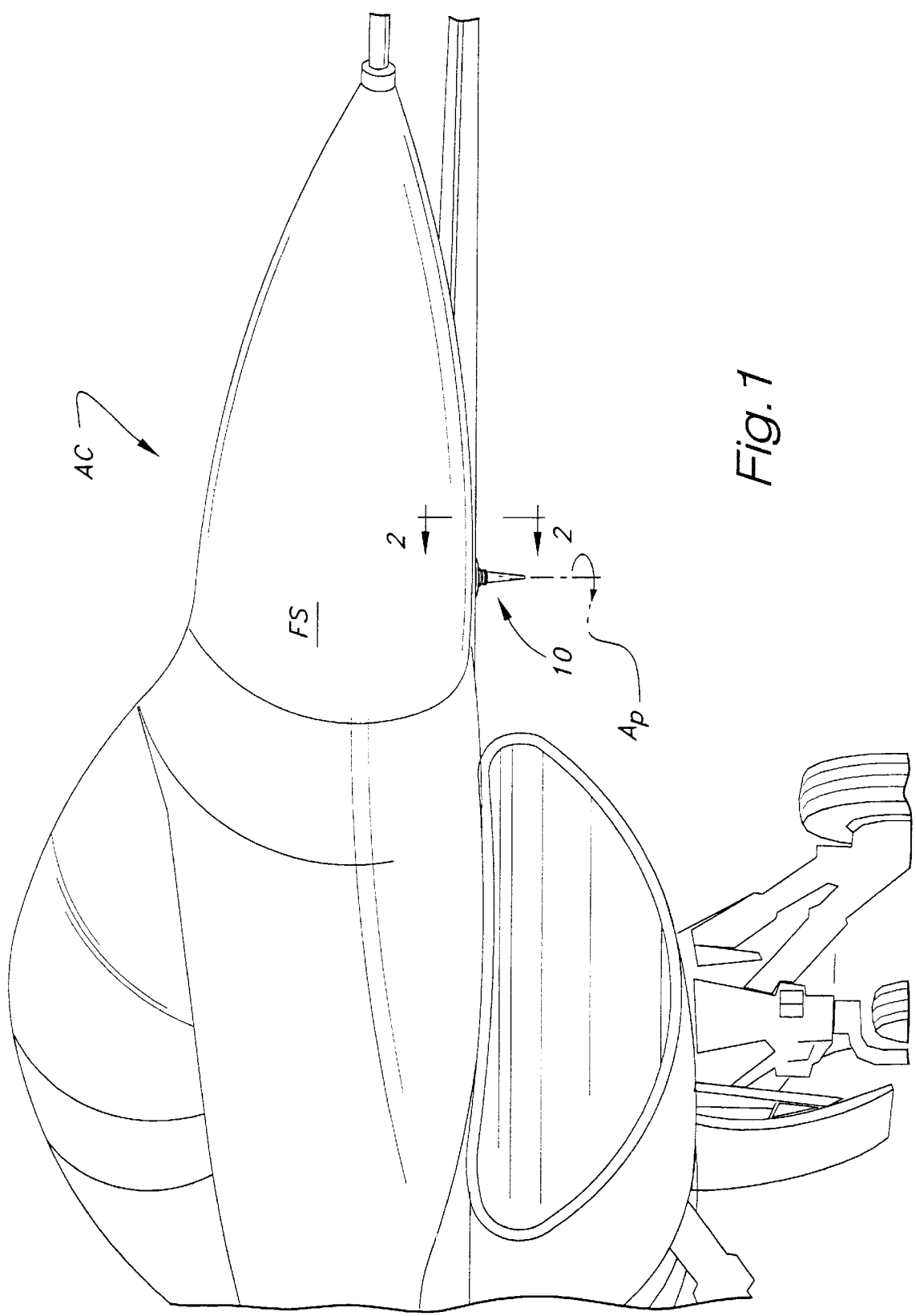

Accompanying FIG. 1 shows in perspective view a portion of an aircraft AC having an aircraft sensor probe assembly 10 in accordance with the present invention mated to a forward fuselage section FS. The probe assembly projects outwardly from the aircraft fuselage FS along a projection axis $A_p$ so as to be exposed perpendicularly to the in-flight airstream. In this regard, although the aircraft sensor probe assembly 10 is depicted in FIG. 1 as projecting downwardly from the aircraft AC, it will of course be understood that it may project laterally from the aircraft AC if desired. Thus, like the sensor assembly disclosed and claimed in the related Baltins et al '526 patent, the probe assembly 10 of this invention may project from the aircraft at virtually any desired orientation so as to decouple the effects of multiple axis aircraft rotations. Thus, a laterally projecting orientation of the probe assembly 10 may be desired if the angle of attack is intended to be measured with as little influence as possible from the aircraft's angle of sideslip. Alternatively, a downwardly projecting orientation as shown in the accompanying drawing FIGURES may be desired if the aircraft's angle of sideslip is intended to be measured with as little influence as possible from the aircraft's angle of attack.

Figure 2A:
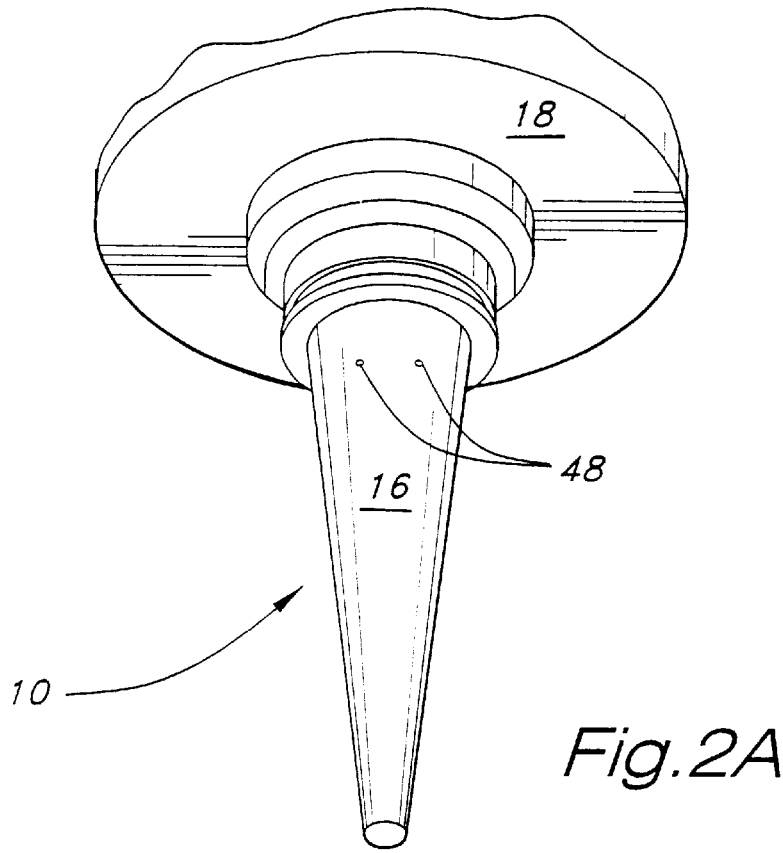
FIG. 2A is a partial rear perspective view of the sensor assembly depicted in FIG. 2.
Figure 6:
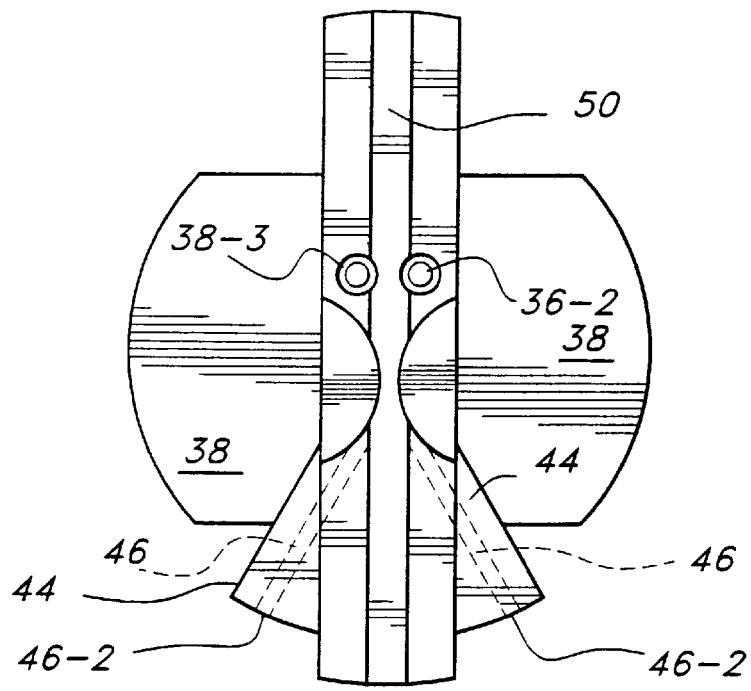
FIG. 6 is a bottom plan view of the rotatable pneumatic sensing vane depicted in FIG. 4.

The airstream direction/pressure data obtained by the probe assembly 10 of this invention may be transferred to the aircraft's on-board flight instrumentation and/or flight director systems via conventional electrical/pneumatic lines connected to the sensor housing 14 (see FIG. 2). In this regard, the internal structures and functions of the housing 14 may be in accordance with the Baltins et al '526 patent, and thus a detailed description thereof may be omitted here.

Figure 3:
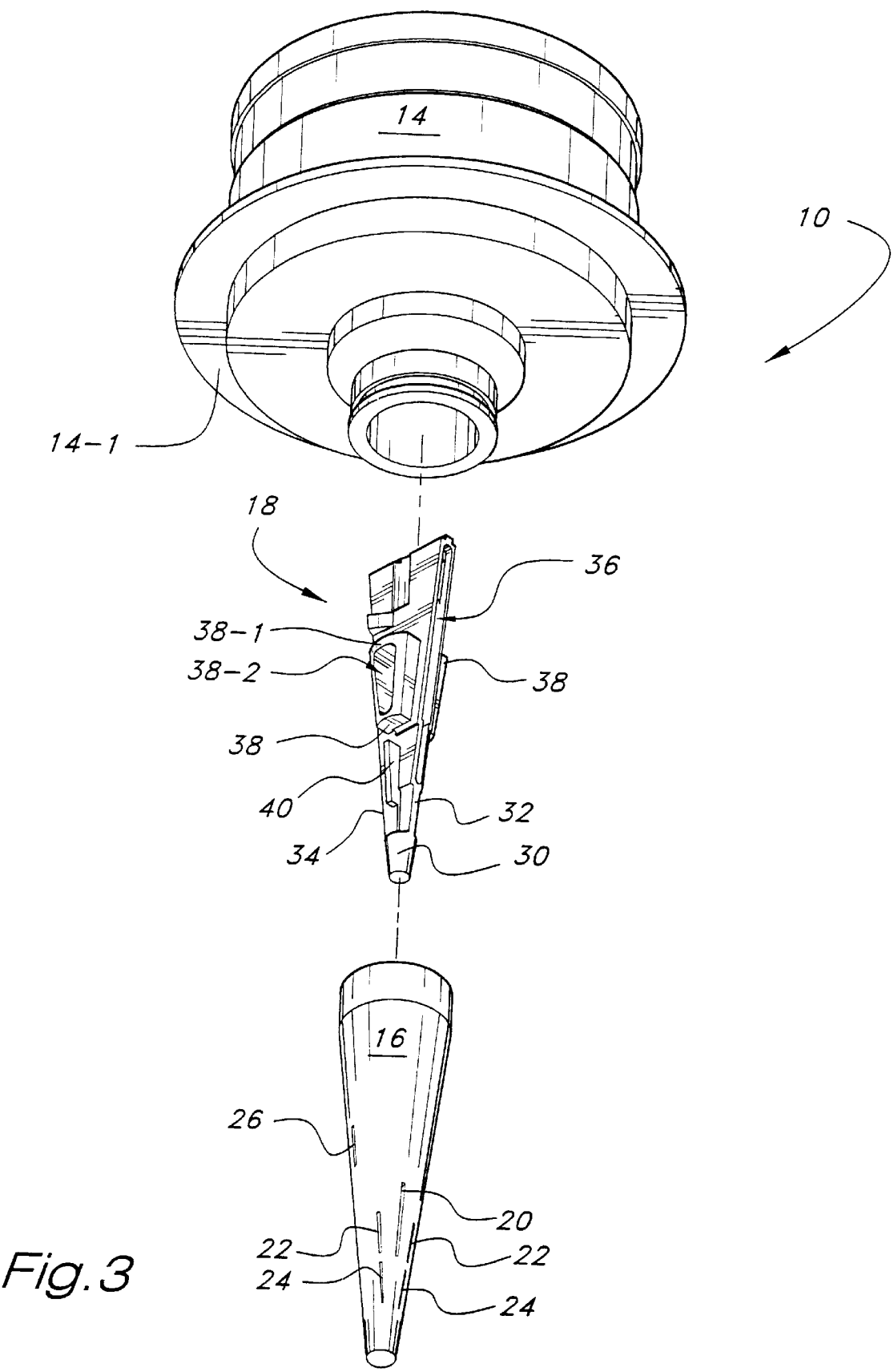
FIG. 3 is a partially exploded perspective view of the preferred sensor assembly of the present invention depicted in FIG. 2.
Figure 4:
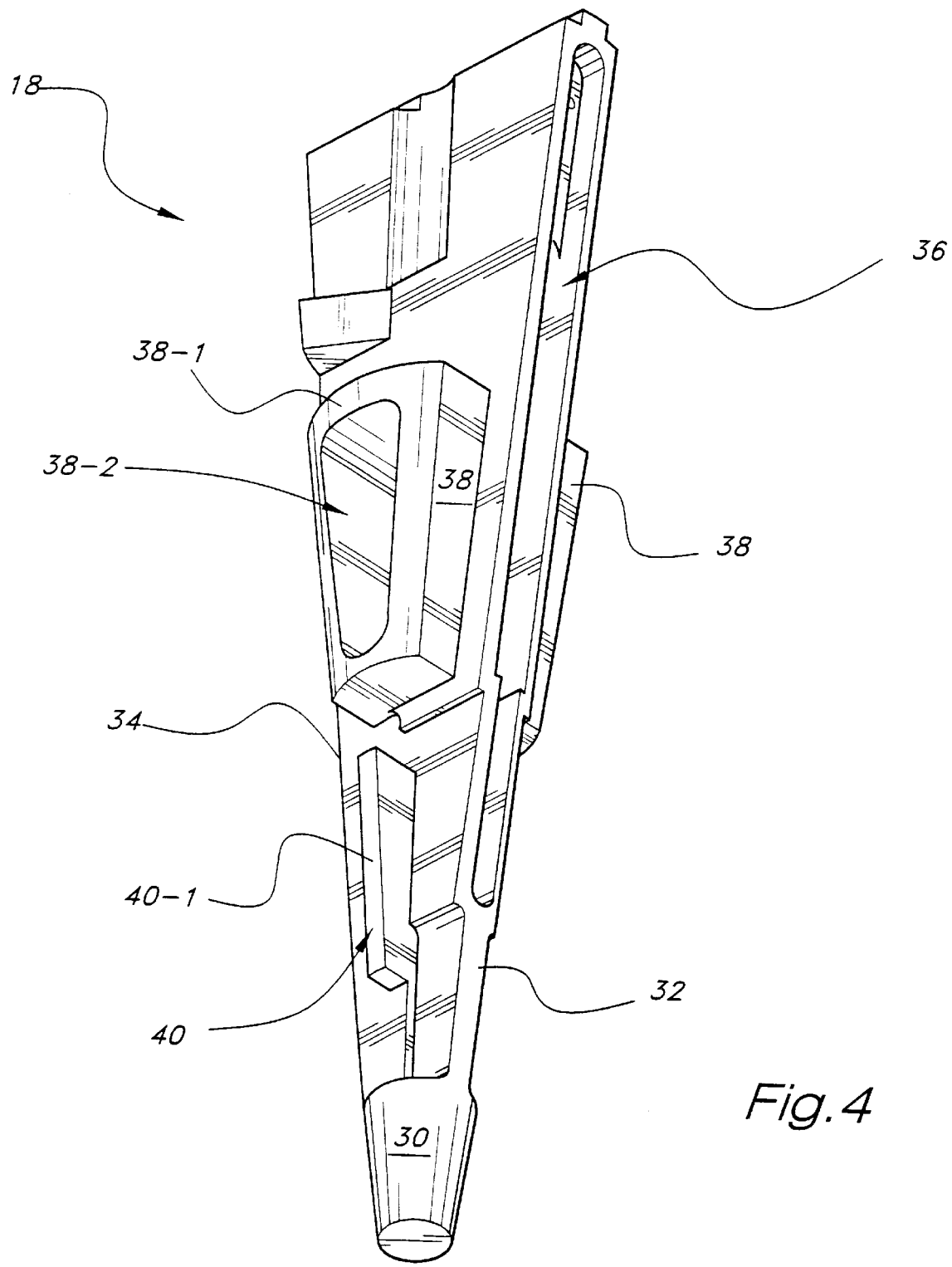
FIG. 4 is an enlarged lateral perspective view of the rotatable pneumatic sensing vane which is employed in the preferred sensor assembly of the present invention.
Figure 5:
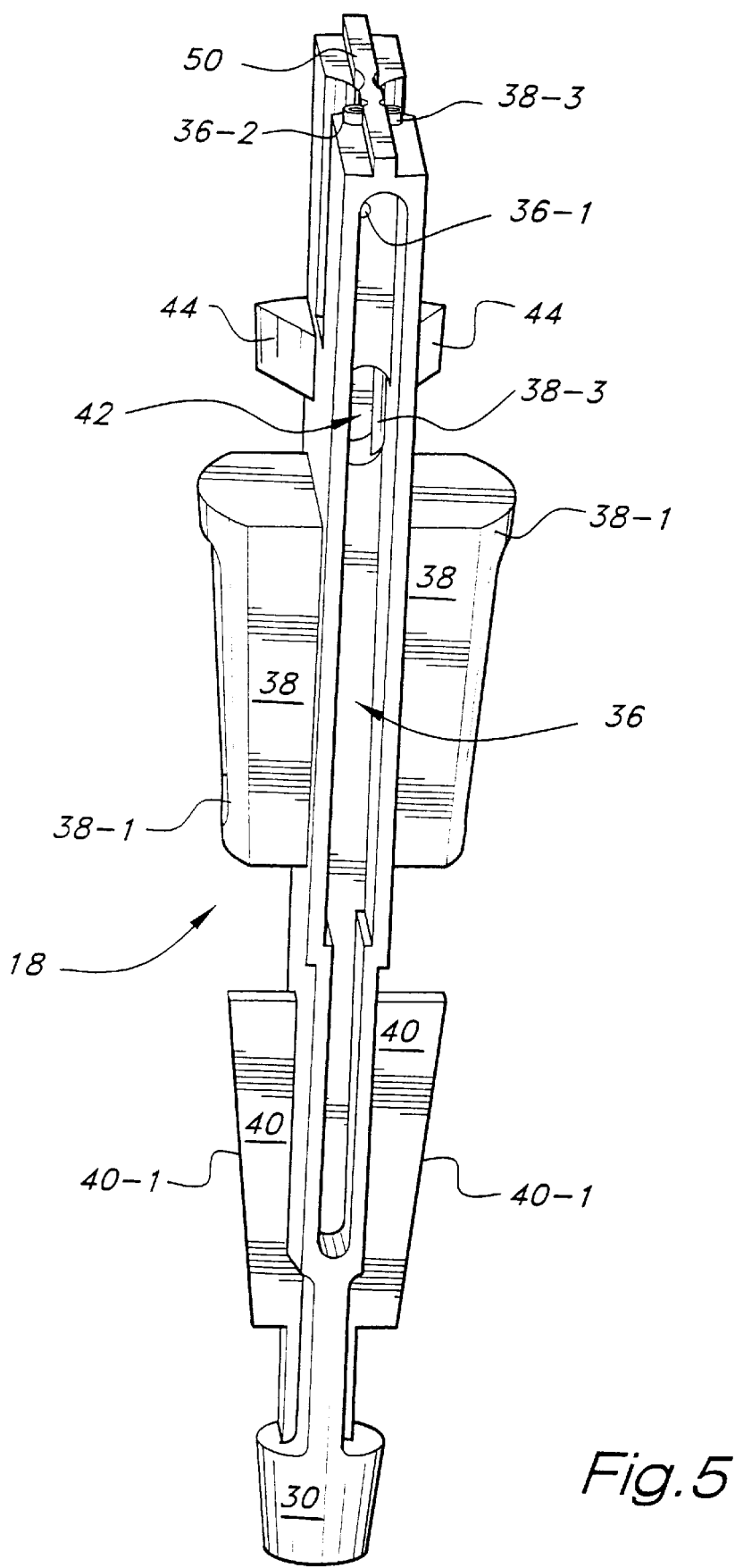
FIG. 5 is an enlarged front perspective view of the rotatable pneumatic sensing vane depicted in FIG. 4.
Figure 7:
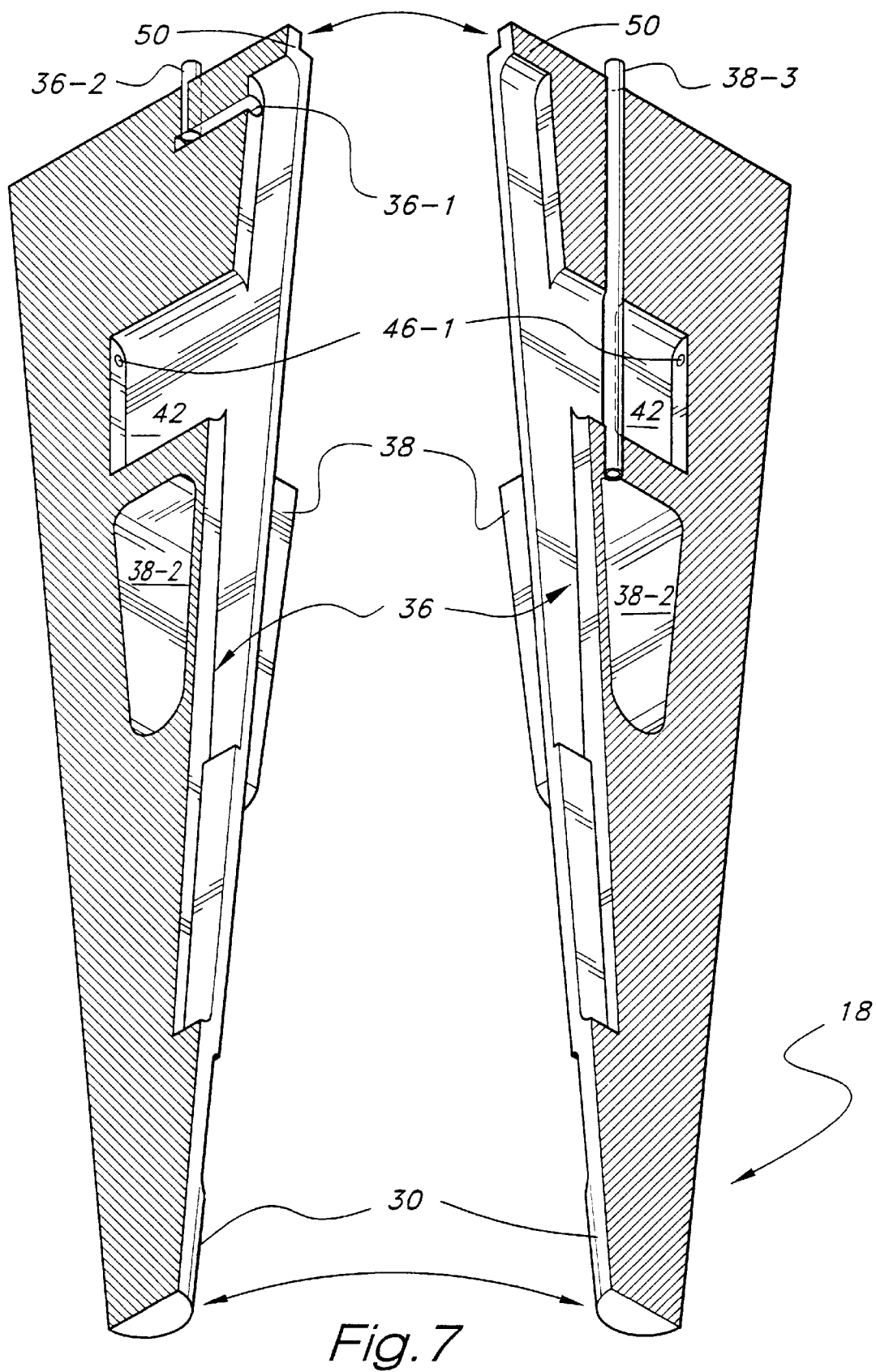
FIG. 7 is a split perspective view of the rotatable pneumatic sensing vane depicted in FIG. 4.

As is perhaps more clearly seen in accompanying FIGS. 2 and 3, the probe assembly 10 is generally comprised of the housing 14, a generally conical hollow probe element 16, a mounting collar 14-1 and a separator vane 18. The mounting collar 14-1 is provided so that the probe assembly 10 may be mounted to support structures S associated with the aircraft's fuselage FS such that the housing 14 is within the fuselage FS and the probe element 16 extends outwardly therefrom along projection axis $A_p$. The separator vane 18 is positioned entirely within the hollow of the probe element 16 and is fixed thereto in such a manner that it rotates as a unit with the probe element 16 around the projection axis $A_p$.

The conically-shaped hollow probe element 16 is mounted to the housing 14 for pivotal movements around the probe projection axis $A_p$. The probe element 16 is provided with a central dynamic pressure sensing port 20 which is aligned with the probe element's stagnation line (or the line of highest airstream pressure impinging on the probe element's surface) coincident with the probe element's projection axis $A_p$. The sensing port 20 is most preferably in the form of an elongate slot, the axis of elongation being disposed generally in the direction of the projection axis $A_p$.

Proximal and distal pairs of pneumatic sensing ports 22 and 24, respectively, are provided in the probe element 16 with each being symmetrically circumferentially spaced from the central dynamic pressure port 20. In this regard, each of the sensing ports 22, 24 is preferably symmetrically circumferentially spaced from the port 20 by substantially 45° (i.e., so that the pairs of proximal and distal inner pressure ports 22 and 24, respectively, are circumferentially spaced from each other by substantially 90°). Each of the ports 22, 24 is most preferably in the form of elongate slots whose longitudinal extent is disposed generally in the direction of the projection axis $A_p$. In addition, as shown particularly in FIG. 2, the proximal and distal ports 22 and 24, respectively, are longitudinally aligned with one another.

A pair of outer pneumatic pressure ports 26 is also provided in the probe element 16. Most preferably, each of the outer pressure ports 26 is symmetrically circumferentially spaced from the central pressure port 20 by about 90° (i.e., so that the pressure ports 26 are substantially latitudinally opposed to one another in the outer surface of the probe element 16). As shown in FIG. 2, the outer pair of pressure ports 26 are proximally positioned in the outer surface of the probe element 16 relative to the more distally located pairs of ports 22 and 24. Like the ports 20, 22 and 24 discussed previously, the ports 26 are most preferably in the form of elongate slots whose longitudinal extent is disposed generally in the direction of the projection axis $A_p$. In this regard, each of the ports 20, 22 and 24 is most preferably tapered toward the apical end of the conical probe element 16. That is, the ports 20, 22 and 24 are tapered to an extent so as to have a substantially constant included angle—that is, so as to taper to the same extent as the probe element 16.

The separator vane 18 is perhaps more clearly depicted in accompanying FIGS. 4–7. In this regard, the separator vane 18 is most preferably in the form of a one-piece triangularly shaped structure which is sized and dimensioned between its converging leading and trailing edges 32, 34, respectively, so as to fit closely within the conical interior of the probe element 16. The apical end of the separator vane 18 is therefore provided with a conical section 30 which is seated against the interior surface of the probe element 16 at its respective apical end.

The leading edge 32 of the separator vane 18 is provided with a recessed elongate leading edge channel 36 which is in aligned, fluid communication with the central pressure port 20 when the separator vane 18 is operatively mated to the probe element 16. Pressure conditions within the leading edge channel 36 communicate with the pressure sensing components (e.g., either contained within the housing 14 and/or part of the aircraft's on-board flight systems) via channel 36-1. In this regard, a tubular conduit 36-2 is preferably inserted into a portion of the channel 36-1 to facilitate connection with the not shown operative pressure sensing components.

A pair of opposed side bosses 38 extend outwardly from each lateral side of the vane separator 18 between its leading and trailing edges 32, 34. The side bosses 38 terminate in a convexly curved surface 38-1 whose generatrices correspond to that of the interior surface of the conically shaped probe element 16. Specifically, the surfaces 38-1 of the bosses 38 are in contact with the interior of the probe element 16 when the separator vane 18 is mated therewith. This contact between the terminal convexly curved edges 38-1 and the probe element 16 allows electrical resistance-generated heat to be transferred to the probe element 16 and thereby serve to prevent in-flight ice accretion near the ports 26.

The side bosses 38 collectively define a generally triangularly shaped through-bore 38-2 which extends transversely relative to the plane of the separator vane 18 (i.e., as defined between its leading and trailing edges 32, 34, respectively) between the surfaces 38-1. When the separator vane 18 is positioned within the hollow probe element 16, the outer pressure ports 26 are in aligned, fluid communication with the through-bore 38-2. The pressure conditions sensed by the outer pressure ports 26, and hence present in the through-bore 38-2 in fluid communication therewith, may be transferred to the on-board operative pressure sensors/instrumentation via a tubular conduit 38-3 (see FIG. 7).

A pair of planar lateral vanes 40 extend substantially perpendicularly from respective sides of the separator vane 18. The terminal edges 40-1 are convexly curved so as to closely correspond to the generatrices of the cylindrical interior surface of the probe element 16. In this regard, these convexly curved terminal edges 40-1 are in contact with the interior surface of the hollow probe element 16 when the separator vane 18 is nested therewithin. This contact between the terminal edges 40-1 and the probe element 16 allows electrical resistance-generated heat to be transferred to the probe element 16 and thereby serve to prevent in-flight ice accretion near the ports 22 and/or 24. Furthermore, it will be observed that the lateral vanes 40 are disposed so as to be subjacent to the proximal pneumatic sensing ports 22 defined in the probe element 16.

The leading edge channel 36 is provided near the triangular base of the separator vane 18 with a recessed sump 42. A symmetrical pair of laterally extending wedge-shaped sections 44 near the trailing edge of the separator vane 18 include respective drain channels 46. Each of the drain channels have a distal end 46-1 (see FIG. 7) which opens into the sump 42 and a proximal end 46-2 (see FIG. 6) which is aligned with drain apertures 48 formed in the trailing side of the probe element 16 (see FIG. 2A).

The base of the separator vane 18 is provided with an elongate key 50 which extends between the leading and trailing edges 32, 34. The key 50 is sized and configured to mate with a corresponding slot (not shown) associated with the internal operative components housed within the base 14.

It will be appreciated that a respective pressure chamber is defined between the separator vane 18 and the interior surface of the hollow conically shaped probe element 16 which is in fluid-communication with the inner pneumatic ports 22, 24. This chamber may thus be connected operatively through the housing 14 to the aircraft's on board pressure sensors/instrumentation by means not shown. In a similar manner, the chambers defined by the leading edge channel 36 and the through-bore 38-2 may be connected operatively through the housing 14 to the aircraft's on-board pressure sensors/instrumentation. Electrical signals indicative of rotation of the probe element may likewise be operatively connected via conventional cabling in a manner similar to that described in the above-cited Baltins et al '526 patent.

While the sensor probe assembly 10 of the present invention has been shown and described as a generally conical geometric configuration, it will be understood that such a form represents a presently preferred embodiment of the invention and is non-limiting with respect thereto. Thus, the sensor probe assembly 10 of the present invention may be provided in other non-conical geometric configurations, such as in the form of a general cylinder, a three-dimensional curvilinear structure, and the like. Suffice it to say here that the precise geometric form of the probe assembly 10 may be selected by those skilled in this art based on the probe's desired end-use environment and/or functions.

Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An aircraft probe assembly comprising:
    an elongate probe element adapted to project outwardly from an aircraft along a projection axis and being rotatable about said projection axis;
    a central pressure port formed in said probe element;
    at least one pair of inner pneumatic ports formed in said probe element and being symmetrically circumferentially separated from said central pressure port by a first angle; and
    at least one pair of outer pneumatic ports formed in said probe element and being symmetrically circumferentially separated from said central pressure port by a second angle greater than said first angle.

2. The aircraft probe assembly of claim 1, wherein said central pressure port, inner pneumatic ports and outer pneumatic ports are slots disposed generally in the direction of said projection axis.

3. The aircraft probe assembly as in claim 2, wherein said probe element is conically shaped and establishes a distal apical end.

4. The aircraft probe assembly as in claim 3, wherein said slots forming said central pressure port, inner pneumatic ports and outer pneumatic ports are tapered toward said apical end of said probe element.

5. The aircraft probe assembly of claim 1, wherein said first angle is about 45°, and wherein said second angle is about 90°.

6. The aircraft probe assembly of claim 1 or 5, which comprises distal and proximal pairs of said inner pneumatic ports.

7. The aircraft probe assembly of claim 6, wherein said inner pneumatic ports of said proximal pair are aligned with a respective one of said inner pneumatic ports of said distal pair generally along said projection axis.

8. The aircraft probe assembly of claim 7, wherein said probe element is a hollow conically shaped structure, and wherein said probe assembly further comprises a separator vane mated within said probe element so as to rotate as a unit therewith about said projection axis, said separator vane and said probe element collectively defining individual chambers which fluid-communicate respectively with said central port, said inner pneumatic ports and said outer pneumatic ports.

9. The aircraft probe assembly as in claim 8, wherein said separator vane includes leading and trailing edges, and wherein said leading edge includes a recessed edgewise channel in communication with said central pressure port.

10. The aircraft probe assembly as in claim 9, wherein said probe element includes a drain aperture, and wherein said separator vane includes a recessed sump which is open to said edgewise channel, and a drain channel having one end in communication with said recessed sump and an opposite end in communication with said drain aperture.

11. The aircraft probe assembly as in claim 8, wherein said separator vane includes a pair of laterally extending bosses which define a through-bore in communication with said outer pneumatic ports.

12. The aircraft probe assembly as in claim 11, wherein said through-bore is generally triangularly shaped.

13. The aircraft probe assembly as in claim 12, wherein said separator vane is generally a triangular planar structure having a base and converging leading and trailing edges, and wherein said bosses extend laterally outwardly from respective sides of said separator vane.

14. The aircraft probe assembly as in claim 1, wherein said elongate probe element is generally conically shaped.

15. An aircraft probe assembly comprising:
    a hollow, generally conically shaped probe element having a pressure port defined therein; and
    a generally triangularly shaped separator vane having leading and trailing edges nested within said probe element, wherein
    said separator vane includes a recessed channel along said leading edge thereof which is in fluid-communication with said pressure port defined in said probe element.

16. The aircraft probe assembly of claim 15, wherein said probe element includes a drain aperture, and wherein said separator vane includes a recessed sump which is open to said leading edge channel, and a drain channel having one end in communication with said recessed sump and an opposite end in communication with said drain aperture.

17. The aircraft probe assembly as in claim 15, wherein said probe element includes a pair of circumferentially separated pneumatic ports, and wherein said separator vane includes a pair of laterally extending bosses which define a through-bore in communication with said outer pneumatic ports.

18. The aircraft probe assembly as in claim 17, wherein said through-bore is generally triangularly shaped.

19. The aircraft probe assembly as in claim 18, wherein said separator vane is generally a triangular planar structure having a base and converging leading and trailing edges, and wherein said bosses extend laterally outwardly from respective sides of said separator vane.

* * * * *